Figure 6:
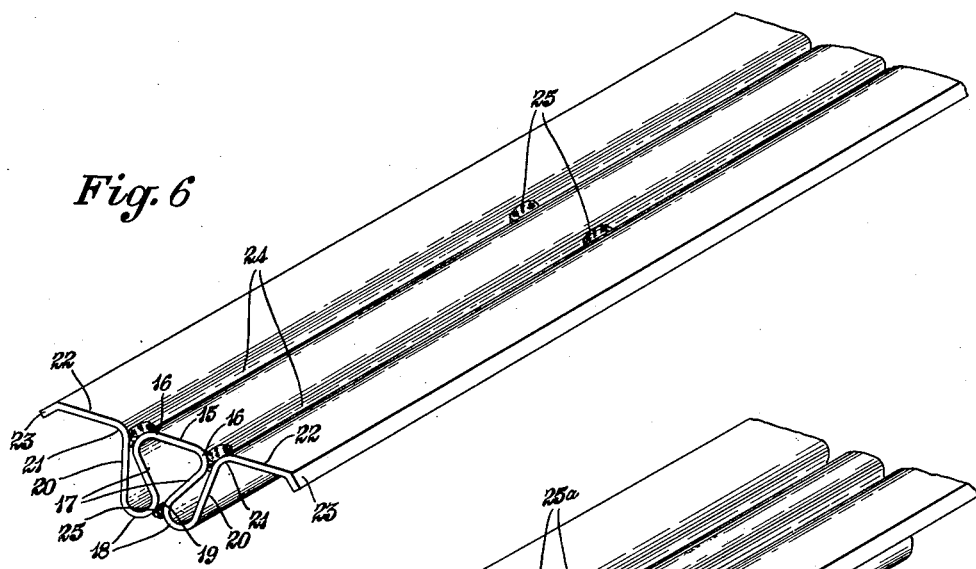

March 10, 1953  S. MACOMBER  2,630,890
MULTIPLE TUBULAR SECTION STRUCTURAL MEMBER
Filed Oct. 7, 1948  3 Sheets-Sheet 1
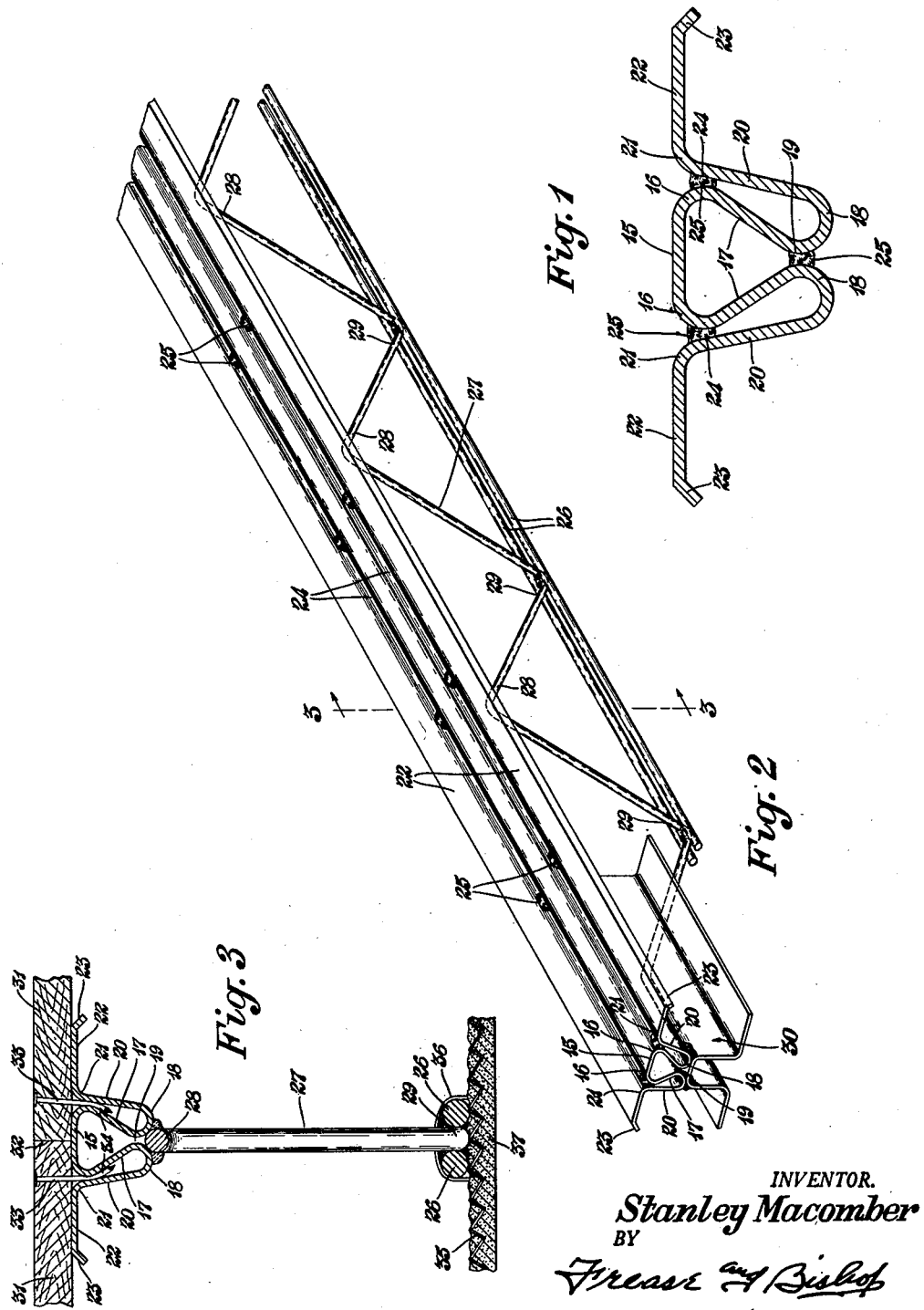
INVENTOR.
Stanley Macomber
BY
Frease and Bishop
ATTORNEYS March 10, 1953 S. MACOMBER 2,630,890
MULTIPLE TUBULAR SECTION STRUCTURAL MEMBER
Filed Oct. 7, 1948 3 Sheets-Sheet 2
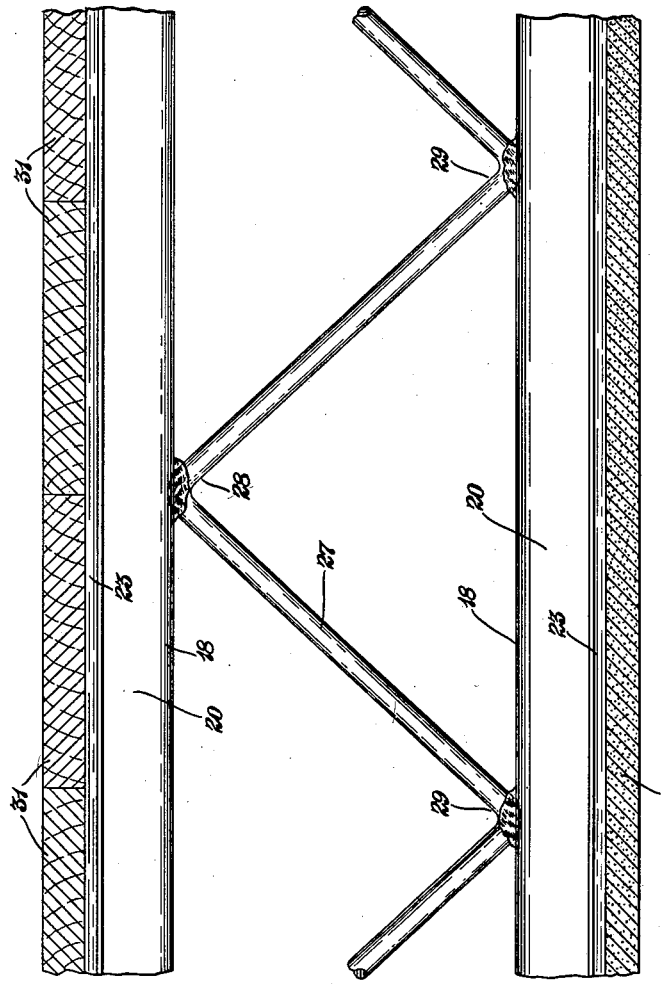
INVENTOR.
Stanley Macomber
BY
ATTORNEYS March 10, 1953 — S. MACOMBER — 2,630,890
MULTIPLE TUBULAR SECTION STRUCTURAL MEMBER
Filed Oct. 7, 1948 — 3 Sheets-Sheet 3

INVENTOR.
Stanley Macomber
BY
Frease and Bishop
ATTORNEYS

Patented Mar. 10, 1953

2,630,890

UNITED STATES PATENT OFFICE 2,630,890

MULTIPLE TUBULAR SECTION STRUCTURAL MEMBER

Stanley Macomber, North Canton, Ohio

Application October 7, 1948, Serial No. 53,280

2 Claims. (Cl. 189—37)

The invention relates to structural members of tubular or V-section formed of a strip or sheet of metal, and more particularly to such a member having a plurality of tubular or triangular cells providing a plurality of nailing grooves for attaching floor boards, metal lath, plaster board or other accessory material thereto.

In my prior applications, Serial No. 640,820, filed January 12, 1946 (now abandoned), and Serial No. 24,749, filed May 3, 1948 (now Patent No. 2,457,250, patented December 28, 1948), I have disclosed tubular or V-section structural members formed of sheet or strip metal bent into substantially tubular or V-shape, having a longitudinal slot or groove to receive and retain nails, screws or other fastening devices.

The present invention contemplates certain improvements upon structural members of this general type in order to provide a plurality of parallel nailing grooves or slots, by forming the section to comprise a plurality of tubular or triangular cells, and by so shaping and constructing the structural member that the nails or other fastening devices will be bent when driven into the nailing grooves so as to more firmly and securely hold them in the grooves.

It is therefore an object of the invention to generally improve the construction of such structural members in order to give additional advantages.

Another object is to provide a structural member comprising a metal strip, of predetermined width and indefinite length, formed to provide spaced tubular or triangular cells providing two parallel spaced grooves for receiving nails, screws or other fastening devices.

A further object is to provide such a structural member in which the tubular or triangular cells are so shaped that nails or other fastening devices driven therein, for securing floor boards, metal lath, wall boards, plaster board or other accessory material thereto, will be bent to one side so as to give an additional hold on the nails or other fastening devices.

A still further object is to provide a structural member of the character referred to having spaced parallel nailing grooves so that the ends of boards or other material attached thereto can be square cut and abutted with a nailing groove for the end of each piece.

Another object is to provide a structural member of this type in which the bottom of the central tubular or triangular cell is raised to the level of the lateral flanges of the structural member, placing the natural axis of the section closer to said flange whereby in floor joist design this results in a larger effective depth providing a greater carrying capacity per pound of steel.

Still another object is the provision of a structural member having spaced parallel nailing grooves on one side and a single nailing groove on the opposite side.

A further object is to provide a structural member of such design that it lends itself to efficient and advantageous use as the top chord as well as the bottom chord of a fabricated floor joist, providing spaced nailing grooves for attaching floor boards to the top chord and spaced nailing grooves for attaching metal lath, plaster board or the like to the bottom chord of the joist.

Figure 7:
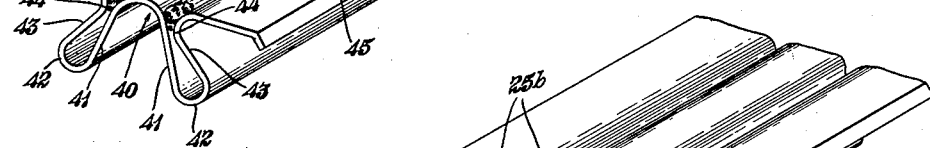
Figure 8:
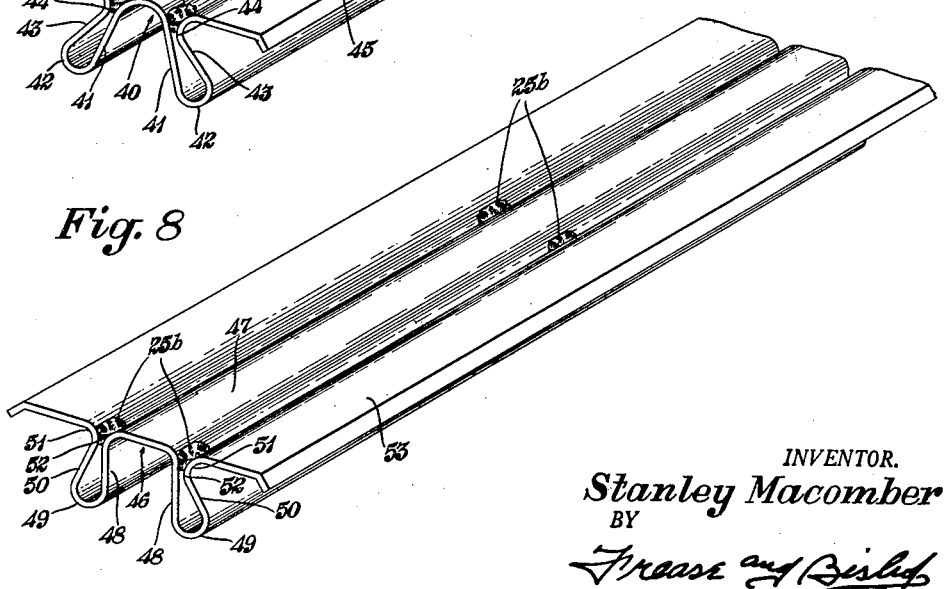

The above and other objects, apparent from the drawings and following description, may be attained, the above described difficulties overcome and the advantages and results obtained, by the apparatus, construction, arrangement and combinations, subcombinations and parts which comprise the present invention, preferred embodiments of which, illustrative of the best modes in which applicant has contemplated applying the principle, being set forth in detail in the following description, and illustrated in the accompanying drawings, in which:

Figure 1 is a transverse sectional view through a structural member embodying the invention;

Fig. 2 a fragmentary, perspective view, on a smaller scale, of one end portion of a fabricated joist, showing the improved structural member as comprising the top chord of the joist;

Fig. 3 a transverse, sectional view, on a somewhat larger scale than Fig. 2, through the fabricated joist;

Fig. 4 a side elevation of an intermediate portion of a fabricated joist in which the improved structural member is shown as used for the top chord and bottom chord of the joist;

Fig. 5 a transverse, vertical, sectional view through the joist shown in Fig. 4;

Fig. 6 a perspective view of one end portion of a structural member embodying the invention;

Fig. 7 a similar view of a slightly modified form of the improved structural member;

Fig. 8 a similar view of another modification of the structural member;

Fig. 9 an enlarged, transverse, sectional view through the structural member shown in Fig. 7; and Fig. 10 an enlarged, transverse, sectional view through the structural member shown in Fig. 8.

Referring now more particularly to the embodiments of the invention illustrated in the accompanying drawings, in which similar numerals refer to similar parts throughout, the form of the invention shown in Figs. 1 to 6 will first be described.

The structural member is formed of a strip or sheet of steel, aluminum, copper, magnesium or any other suitable metal of the gauge and width required for the particular purpose, and the central portion of the strip is formed to substantially triangular or V-shape, comprising the flat top wall 15 connected through the curved bends 16, which are preferably on a radius more than twice the thickness of the metal, with the downwardly converging, substantially flat side walls 17, having the spaced, oppositely curved, rounded bends 18, the radii of which have the same relation to the thickness of the metal, at the apex of the triangle or V to form a central, longitudinal, downwardly facing slot or groove 19.

A substantially triangular or V-shape cell is formed upon each side of this central cell by then bending the metal of the strip upwardly on each side from the rounded bends 18, forming the flat side walls 20 having the rounded bends 21, similar to the bends 16, at their upper ends, and preferably terminating in the laterally disposed, flat flanges 22 in the plane of the top wall 15.

For the purpose of increasing the strength and rigidity of the structural member, the terminal ends of the flanges 22 may be angularly bent as at 23. Thus a spaced pair of parallel, longitudinally disposed slots or grooves 24 are formed in the upper side of the structural member, and on opposite sides of the central triangular or V-shape cell.

It is desirable that the rounded bends 16, 18 and 21 all be formed upon a considerable radius, which, as quite clearly shown in Fig. 1, should be more than twice the thickness of the metal, regardless of the gauge of the metal strip of sheet from which the structural member is formed. It is also desirable that the overall width of the structural member be greater than the height, as best shown in Fig. 1.

For the purpose of holding the width of the slots or grooves 19 and 24 to a definite spacing as well as to assist in strengthening and reinforcing the structural member and holding it rigidly in the formed position, the slots or grooves 19 and 24 may be welded or otherwise connected at spaced intervals as indicated at 25.

This structural member is adapted for use in a variety of structural units, but for the purpose of illustration it is shown in Figs. 2 to 5 inclusive as comprising the top chord of a fabricated steel joist, Figs. 4 and 5 showing the improved structural member as also used for the bottom chord of the joist.

Such a fabricated joist may comprise the top chord formed of the improved structural member constructed in the manner above described, the bottom chord comprising two parallel straight bars or rods 26, as in Figs. 2 and 3, or one of the improved structural members, in inverted position, as shown in Figs. 4 and 5, and a bar or rod 27 constituting the web member of the joist and being bent reversely to form a successive series of oppositely directed V's, the upper angles 28 of which are welded or otherwise connected to the top chord and the lower angles 29 of which are similarly attached to the bottom chord.

Any suitable type of bearing plate, as indicated generally at 30, may be connected to each end portion of the top chord, and opposite ends of the web rod 27 may be attached to the bearing plates, in order to complete the structure of the joist.

The improved multiple cell structural member has greater strength and rigidity than the single tubular or V-section member disclosed in my prior application above referred to, and has the added advantage of the multiple nailing grooves for attaching the abutting ends of boards or the like, and also provides means for bending the nails or other fastening means so as to cause them to hold more securely.

As shown in Figs. 3 and 5, floor boards 31 may have their adjacent ends square cut and butted together at the longitudinal center of the upper chord, as shown at 32, and nails, screws or the like, as indicated at 33 may be driven through the boards 31 and into the grooves 24 of the upper chord, being bent to one side as shown at 34 to more securely hold them against accidental displacement.

When the bottom chord is formed of rods or bars 26, as shown in Fig. 3, wire lath or the like, as indicated at 35, may be attached thereto as by wire ties 36, and a plaster coat 37 may be placed thereover to provide a suitable finish for a ceiling.

However, where the improved structural member is used for the lower chord, as shown in Fig. 5, the wire lath 35a may be attached to the lower chord by means of nails 38, driven upward through the lath and into the grooves 24 of the structural member, being bent to one side as shown, and the plaster coat 39 may be applied to the lath as in usual practice.

In the modification shown in Figs. 7 and 9 the structural member comprises the central, inverted U-shape portion indicated generally at 40, having the diverging legs 41, with rounded bends 42 at their lower ends, and the upwardly converging, flat walls 43 forming spaced tubular cells on opposite sides of the U-shape central portion, with spaced, parallel nailing grooves 44 at their upper ends, and lateral, oppositely disposed horizontal flanges 45 at each side thereof. The grooves 44 may be welded or otherwise attached at spaced intervals as indicated at 25a.

This form of the structural member may be used in the same manner as above described with reference to the preferred form of the invention, and provides two, spaced, parallel angular grooves for receiving and bending nails or other fastening devices for securing accessory materials to the structural member.

The modification shown in Figs. 8 and 10 differs only slightly from that shown in Figs. 7 and 9, and comprises the central, inverted U-shape portion 46, having the flat top wall 47 and the straight, vertical side walls 48 which merge at their lower ends into the rounded bends 49, from which the straight side walls 50 converge upwardly, forming spaced triangular cells on opposite sides of the central U-shape portion.

At their upper ends the walls 50 merge into the rounded bends 51, forming the longitudinally spaced, parallel grooves 52, after which the structural member terminates in the oppositely disposed, horizontal flanges 53, in the plane of the top wall 47.

For the purpose of holding the grooves 52 to a definite spacing, and also to assist in stiffening and reinforcing the member, the grooves 52 may be welded or otherwise attached at intervals, as indicated at 25b.

This form of the invention may also be used in any manner above described and provides two spaced, parallel grooves for receiving nails or other fastening devices for securing accessory materials to the structural member.

According to the provisions of the patent statutes I have explained the principle of my invention and described certain embodiments thereof, but I desire to have it understood that within the scope of the appended claims, the invention may be practiced otherwise than as specifically illustrated and described, the invention residing in the multiple grooved structural member formed from a single strip of metal.

I claim:

1. A fabricated steel joist including a top chord comprising a structural member comprising a single strip of sheet metal of indefinite length and uniform cross-section, longitudinally bent so that the longitudinal central portion of the strip forms the top wall of the structural member, the strip at each edge of said top wall extending downward and inward to points adjacent to each other forming a central tubular portion with a longitudinal groove at its lower side, then outward and then upward to points adjacent to opposite edges of said top wall forming depending tubular portions with longitudinal grooves at their upper sides, the terminal edge portions of the strip forming oppositely disposed flanges in the plane of said top wall, a bottom chord spaced below the top chord and a web member connected to both chords.

2. A fabricated steel joist including a top chord comprising a structural member comprising a single strip of sheet metal of indefinite length and uniform cross-section, longitudinally bent so that the longitudinal central portion of the strip forms the top wall of the structural member, the strip at each edge of said top wall extending downward and inward to points adjacent to each other forming a central tubular portion with a longitudinal groove at its lower side, then outward and then upward to points adjacent to opposite edges of said top wall forming depending tubular portions with longitudinal grooves at their upper sides, the terminal edge portions of the strip forming oppositely disposed flanges in the plane of said top wall, and welds at spaced points in the entrances to said grooves for rigidly holding the walls thereof to a predetermined definite spacing, a bottom chord spaced below the top chord and a web member connected to both chords.

STANLEY MACOMBER.

REFERENCES CITED

The following references are of record in the file of this patent:

UNITED STATES PATENTS

| Number | Name | Date |
|---|---|---|
| 557,147 | Rapp | Mar. 31, 1896 |
| 717,923 | Rapp | Jan. 6, 1903 |
| 1,574,586 | Loucks et al. | Feb. 23, 1926 |
| 1,677,714 | Frease | July 17, 1928 |
| 1,951,811 | Schaffert | Mar. 20, 1934 |
| 2,063,714 | Waugh et al. | Dec. 8, 1936 |
| 2,098,676 | Rafter | Nov. 9, 1937 |
| 2,112,480 | Coddington | Mar. 29, 1938 |
| 2,440,053 | Macomber | Apr. 20, 1948 |